United States Patent
Glejbol et al.

(10) Patent No.: US 7,069,955 B2
(45) Date of Patent: Jul. 4, 2006

(54) FLEXIBLE ARMOURED PIPE AND USE OF SAME

(75) Inventors: Kristian Glejbol, Glostrup (DK); Jakob Wedel-Heinen, Charlottenlund (DK)

(73) Assignee: NKT Flexibles I/S, Brondby (DK)

( * ) Notice: Subject to any disclaimer, the term of this patent is extended or adjusted under 35 U.S.C. 154(b) by 702 days.

(21) Appl. No.: 10/204,179

(22) PCT Filed: Jan. 11, 2001

(86) PCT No.: PCT/DK01/00017

§ 371 (c)(1),
(2), (4) Date: Nov. 13, 2002

(87) PCT Pub. No.: WO01/61232

PCT Pub. Date: Aug. 23, 2001

(65) Prior Publication Data

US 2006/0048833 A1   Mar. 9, 2006

(30) Foreign Application Priority Data

Feb. 16, 2000 (DK) ............................... 2000 00242

(51) Int. Cl.
*F16L 11/00* (2006.01)

(52) U.S. Cl. .................... 138/135; 138/134; 138/149; 138/138

(58) Field of Classification Search ............... 138/134, 138/135, 140, 137, 149, 138
See application file for complete search history.

(56) References Cited

U.S. PATENT DOCUMENTS

| | | | | | |
|---|---|---|---|---|---|
| 3,651,661 | A | * | 3/1972 | Darrow | 464/181 |
| 4,402,346 | A | * | 9/1983 | Cheetham et al. | 138/129 |
| 4,673,002 | A | * | 6/1987 | Scanlon et al. | 138/149 |
| 5,177,996 | A | * | 1/1993 | Sahakian | 73/40 |
| 5,645,109 | A | * | 7/1997 | Herrero et al. | 138/134 |
| 5,813,439 | A | * | 9/1998 | Herrero et al. | 138/134 |
| 5,934,335 | A | | 8/1999 | Hardy | 138/131 |
| 6,401,760 | B1 | * | 6/2002 | Espinasse | 138/135 |
| 6,668,866 | B1 | * | 12/2003 | Glejbol et al. | 138/134 |
| 6,843,278 | B1 | * | 1/2005 | Espinasse | 138/134 |

FOREIGN PATENT DOCUMENTS

| | | | |
|---|---|---|---|
| DE | 1525658 | A | 11/1969 |
| EP | 0937932 | A2 | 8/1999 |

* cited by examiner

*Primary Examiner*—Patrick Brinson
(74) *Attorney, Agent, or Firm*—Merchant & Gould

(57) ABSTRACT

An armoured flexible pipe consists of an inner liner (3), which surrounds a carcass (1, 2). On the other side of the inner liner (3) there are two armour layers, where the innermost (5, 6) is a pressure armour layer, while the outermost (7, 8) is a tensile armour layer. An outer sheath (9) is finally applied around the armour layers. With the object of ensuring a low transport of heat through the walls of the pipe, one or more thermally-insulating layers (10) are extruded on the outside of the inner liner, where, depending on the use of the pipe, the layers can consist, for example, of a polymer or polymeric mixture, polyolefin, such as a polypropylene, or a polyketon. The flexible pipe according to the invention is especially applicable for use in the extraction, transport or refining of mineral oil or related fluids.

6 Claims, 1 Drawing Sheet

FLEXIBLE ARMOURED PIPE AND USE OF SAME

Figure 1:
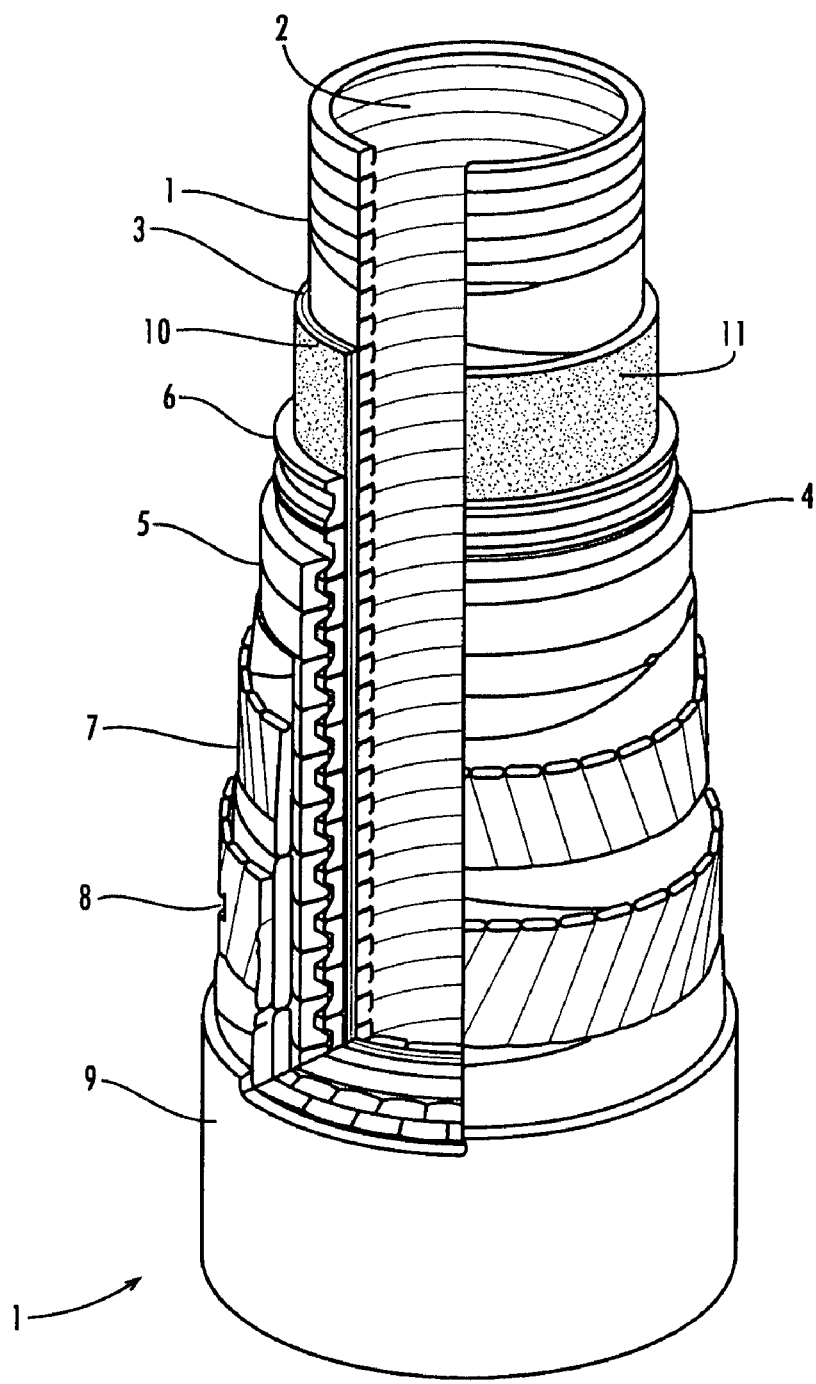

The invention concerns an armoured flexible pipe comprising an inner liner which surrounds a carcass, and where on the outer side of the inner liner there is a pressure armour layer and a tensile armour layer which are shielded from the surroundings by an outer sheath, and further comprising a thermally-insulating layer on the outside of the inner liner.

The invention also concerns a use of the pipe.

Pipes of the above-mentioned type normally comprise an inner liner, which forms a barrier against the outflow of the fluid, which-is conveyed through the pipe. The inner liner is wound with one or more armour layers which are not chemically bound to the inner liner but which can move in relation thereto, which ensures the flexibility of the pipe during laying out and operation.

Around the armour layers an outer sheath is provided with the object of forming a barrier against the ingress of fluids from the pipe surroundings to the armour layers. In order to prevent the collapse of the inner liner, this is often provided on the inner side with a flexible, wound pipe, a so-called carcass.

The above-mentioned type of flexible pipes is used, among other things, for the transport of fluids and gases in different depths of water. They are used especially in situations where very high or varying water pressure exists along the longitudinal axis of the pipe. As examples can be mentioned riser pipes which extend from the seabed up to an installation on or near the surface of the sea. Pipes of this type are also used between installations, which are located at great depths on the seabed, or between installations near the surface of the sea.

The armour layers, which are used as pressure armour, are most often constructed in such a way that they comprise different metallic profiles. When wound with a large angle in relation to the longitudinal axis of the pipe, these profiles will be able to absorb radial forces resulting from outer or inner pressure on the pipe. Among other things the profiles thus prevent the pipe from collapsing or exploding as a result of pressure, and are thus called pressure-resistant profiles.

Conversely, profiles, more specifically tensile armour layers, which are wound with a small angle in relation to the longitudinal axis of the pipe, will not be able to absorb radial forces to any significant degree, but on the other hand are able to absorb forces exerted along the longitudinal axis of the pipe. In the following, this type of profiles is referred to as tension-resistant profiles.

Together, the tension-resistant profiles and the pressure-resistant profiles form the armour for the pipe. In this armouring layer a free volume of such configuration also exists that this can be ventilated, whereby a destructive build-up of pressure as a result of diffusion does not arise.

A problem in connection with the use of pipes of the type described above is that the transport of heat through the walls of the pipe can be quite considerable. With certain uses this is critical, since this type of pipe is often used to transport fluids, which are desired to be held at a temperature, which deviates from that of the surroundings. As an example of such a use can be mentioned that of transporting crude oil between two installations. If the temperature of the crude oil falls below a certain critical limit, mineral wax and solid hybrids can be formed in the pipe, which results in stoppages in the pipe.

In order to hold the transport of heat through the walls of the pipe at an acceptable level, it is known to wind one or more layers of bands made of a so-called syntactic foam on the outside of the pipe's tension-resistant armour, but on the inside of the outer sheath. This foam contains a great amount of hollow glass balls, which have very great resistance against crushing, and a polymeric matrix material. Syntactic foam possesses a low heat conductivity coefficient, whereby the use of this material reduces the transport of heat through the walls of the pipe to an acceptable level.

However, the use of syntactic foam involves a number of limitations, the most important of which is that the mechanical strength of the foam often becomes that factor which limits the areas of application of the pipe. The syntactic foam thus possesses very great resistance against hydrostatic crushing, but only limited resistance against deformation and damage by local mechanical influences. A second problem connected with the use of syntactic foam is that the long-term characteristics of this material can be problematic to predict.

U.S. Pat. No. 5,934,335 discloses an armoured flexible pipe having an inner liner which surrounds a carcass. The thermally insulating layer according to this publication is not intended to protect against destructive build-up of gases and condensation in the area between the inner liner and the thermally insulating layer.

It is therefore the object of the present invention to provide a new method whereby a sufficiently low transport of heat through the walls of the pipe is ensured, and further to ensure that a destructive build-up of gases and condensation does not occur in the area between the inner liner and the extruded layer.

The object of the invention is achieved in that the thermally insulating layer is permeable to fluids.

In one disclosed embodiment the thermal insulation consists of one, two or more layers. A first inner layer can be selected on the basis of the desire concerning low permeability to the fluid which is transported in the pipe, while a second inner layer can be selected on the basis of the desire to ensure a sufficient thermal insulation between the fluid which is transported through the pipe and the pipe's armour layer.

Preferably, the extruded layer is configured with an adequate permeability, e.g. by providing the thermal insulation with a number of small holes as disclosed herein.

Further expedient embodiments of the invention are disclosed herein.

As mentioned, the invention also concerns a use of the pipe. This use of the flexible pipe comprises use for the extraction, transport, or refining of mineral oil or related fluids, or for the transport of cold fluids such as, e.g., liquid ammonia.

The invention will now be described in more detail with reference to the drawing which comprises only one figure, and which shows the construction of an armoured flexible pipe according to the invention with its various layers.

The figure shows a pipe, which comprises an inner liner 3, which surrounds a carcass 1 consisting of a helically wound metal strip 2, which forms an inner pipe. During manufacture, the metal strip 2 is formed with flaps, which engage with each other so that they hereby lock the individual windings of the metal strip 2 together in such a manner that the carcass 1 can be bent in its longitudinal direction.

Since the inner carcass 1 in itself is not impermeable, the purpose of the surrounding inner liner 3 is to prevent fluids from flowing to or from the inside of the pipe. Since the inner liner is selected on the basis of the desire concerning low diffusion of gases from the inside of the pipe to the armour layer, it is most often not possible at the same time to produce this from a material which possesses a sufficiently high thermal resistance to ensure the function of the pipe.

Therefore, around the inner liner 3 one or more further layers 10 (the figure shows one layer) are applied by extrusion. The function of this or these layers is exclusively to ensure a sufficient thermal insulation between the fluid transported inside the pipe and the surrounding armour layer. There is thus great freedom in the selection of the material or materials for these layers, in that regard to permeability to fluids is not important.

On the outside of the thermally-insulating layer(s) 10, one or more layers of profiles 5,6 are wound in a helical manner, said profiles forming windings with a large angle in relation to the longitudinal direction of the pipe. As a consequence of the large angle, the profiles are primarily able to absorb radial forces, which arise as a result of inner or outer pressure. The inner pressure arises during operation of the pipe. The outer pressure arises partly as a result of the hydrostatic pressure of the surroundings, and partly as a result of mechanical influences during the laying of the pipe. The windings thus form a pressure armour which prevents the inner liner 3 and the thermally-insulating layers from exploding as a result of high pressure on the inside of the pipe, or from collapsing as a result of high pressure on the outside of the pipe.

From FIG. 1 it will also be seen that a tensile armour consisting of one or several helically wound layers 7,8 is provided on the outside of the pressure armour.

Between the pressure armour and the tensile armour an intermediate sheath (not shown in the figure) can be provided, the purpose of which is to prevent fluids from migrating between the tensile armour and the pressure armour. These layers are finally surrounded by an outer sheath 9.

In addition to its thermal insulation capabilities, the thermally insulating layer according to the invention must fulfil a number of other requirements, which are explained below.

In the design and manufacture of the layer, this must be designed in such a way that the destructive build-up of fluids in the interface layer between the layer and the liner is prevented, in that a suitable and effective transport path from the interface layer to the armour layer is ensured. There are several methods by which this can be ensured, among which can be mentioned:
- by providing the extruded layer with defects which can ensure a relatively unhindered transport between the interface and the armour layer,
- by selecting a thermally-insulating layer with suitably low barrier characteristics against the gases which may diffuse through the inner liner,
- by ensuring a transport path between the interface and the armour layer at the terminating end of the pipe.

Combinations of the above-mentioned methods could also be used.

Besides, as a consequence of the inner pressure in the pipe, the inner liner and the thermally insulating layer will be able to be pressed out in the armour layer. If the thermally insulating layer is pressed out through the armouring strips, this will reduce the flexibility of the pipe to a considerable degree. Therefore, it is important that the thermally insulating layer possesses the necessary mechanical strength, so that it is not crushed or deformed by any disproportional amount during manufacture, laying-out and operation of the pipe.

Several embodiments of the thermally insulating layer can be envisaged, depending on its use.

In the following, three examples of the use of the armoured pipe according to the invention will be described:

EXAMPLE 1

An oil well delivers a fluid, which consists substantially of hydrocarbons and $CO_2$. In that the oil in the well has a temperature of 120° C., PVDF (polyvinylidenedifluoride) is selected for the liner, in that PVDF is particularly suitable for use at high temperatures and has a very low permeability to $CO_2$. However, the liner cannot provide safeguard against a too severe cooling of the oil, and for this reason a layer of PP (polypropylene) is extruded around the liner. In that PP has much poorer barrier characteristics against $CO_2$ than PVDF, a destructive build-up of pressure will not arise in the interface layer. At the same time, the PP layer ensures that the thermal transport of heat between the inside of the pipe and the armour layer is held at an acceptable level. Since the permeability of the PP layer decreases with the temperature, a very thick PP layer will require to be provided with defects, which will serve as transport paths for diffused gases.

EXAMPLE 2

An oil well delivers a fluid, which is substantially a mixture of aromatic hydrocarbons and water. In that the temperature of the oil well is low, PA 11 (polyamide 11) is selected as liner material. A polyketon is selected as thermal insulation material. In order to prevent the accumulation of water in the interface layer, a series of small holes 11 is established in the thermal insulation material, which ensures that water which is diffused from the inside of the pipe into the interface layer can escape.

EXAMPLE 3

An oil well delivers a fluid, which almost gives rise to the formation of wax, which means that a very high thermal insulation capability is demanded for the pipe. Around the inner liner, which is made of PE (polyethylene), a thermally insulating multi-layer is applied, which is built up of a layer of extruded, syntactic foam on which a layer of solid polypropylene is extruded. Because of the low temperature, the diffusion through the inner liner is not problematic, and thus no further measures are taken to prevent destructive build-up of gases in the interface layers. Here, the thermally insulating layer is built up of two layers, i.e. a layer of syntactic foam, which has excellent thermal insulation characteristics, and an outer layer of PP, which has poorer thermal characteristics but, on the other hand, possesses excellent mechanical characteristics.

It will be obvious that the insulation can be configured in many more ways than described in the examples above, which merely serve to illustrate the multiplicity of possibilities, which are available for configuration of thermal insulation within the scope of the patent claims.

The invention claimed is:

1. Armored flexible pipe comprising an inner liner which surrounds a carcass, and where on the outer side of the inner liner there is a pressure armor layer and a tensile armor layer which are shielded from the surroundings by an outer sheath, characterized in that a thermally-insulating layer consisting of a homogenous polymer or a polymer mixture is provided with a number of small holes and is permeable to fluids.

2. Armored flexible pipe according to claim 1, characterized in that a part or the whole of the thermal insulation comprises a polyolefin.

3. Armored flexible pipe according to claim 1, characterized in that a part or the whole of the thermal insulation comprises a polyketon.

4. The process of transporting oil or related fluids, or of cold fluids comprising the step of transporting said fluid through a flexible pipe according to claim 1.

5. An armored flexible pipe comprising an inner liner which surrounds a carcass, and where on an outer side of the inner liner there is a pressure armor layer and a tensile armor layer which are shielded from the surroundings by an outer sheath, and further comprising a thermally-insulating layer that is permeable to fluids and is provided with means which permit an adequate removal of materials diffused to an interface layer between the inner liner and the thermally insulating layer.

6. An armored flexible pipe comprising an inner liner which surrounds a carcass, and where on an outer side of the inner liner there is a pressure armor layer and a tensile armor layer which are shielded from the surroundings by an outer sheath, further comprising a thermally-insulating layer that is permeable to fluids and comprises two or more layers, wherein two layers consist essentially of a syntactic foam and of polypropylene.

* * * * *